United States Patent [19]

De Haeck

[11] 4,109,059

[45] * Aug. 22, 1978

[54] FLUX-CORED WIRE FOR ELECTRIC ARC WELDING

[75] Inventor: Robert De Haeck, St. Pieters-Kapelle, Belgium

[73] Assignee: La Soudure Electrique Autogene, Procedes Arcos, Anderlecht, Belgium

[*] Notice: The portion of the term of this patent subsequent to Apr. 5, 1994, has been disclaimed.

[21] Appl. No.: 771,333

[22] Filed: Feb. 23, 1977

Related U.S. Application Data

[63] Continuation of Ser. No. 587,554, Jun. 17, 1975, Pat. No. 4,106,399.

[51] Int. Cl.² ............................................... B23K 35/22
[52] U.S. Cl. ....................................... 428/558; 148/24; 148/26; 219/145.22
[58] Field of Search ................... 148/24, 26; 219/145, 219/146; 428/558

[56] References Cited

U.S. PATENT DOCUMENTS

| | | | |
|---|---|---|---|
| 3,152,019 | 10/1964 | Shrubsall | 148/26 |
| 3,539,765 | 11/1970 | Duttera et al. | 219/146 |
| 3,760,146 | 11/1970 | Rozet | 219/146 |
| 3,769,099 | 10/1973 | DeLong et al. | 219/146 X |
| 3,787,658 | 1/1974 | Kammer et al. | 219/146 |
| 3,805,016 | 4/1974 | Soejima et al. | 219/146 |
| 4,016,399 | 4/1977 | De Haeck | 219/146 |

*Primary Examiner*—Richard E. Schafer
*Attorney, Agent, or Firm*—Eugene Chovanes; Edward Lovett Jackson

[57] ABSTRACT

Flux-cored wire as mentioned below, in which a sheath of steel strip is filled with a powder, a selection of iron powders or earth carbonates or fluorides and ferro-metallic deoxidizers and arc stabilizers are added and the mixture is baked at about 570° to 620° C, specific compositions as detailed in the description being used in the powder, the powder specifically having added to it 1 to 3% by weight of powder of atomized silicate, and the sheath being of low-carbon or low-alloy steel, the whole being sifted preferably at 100 mesh.

10 Claims, No Drawings

FLUX-CORED WIRE FOR ELECTRIC ARC WELDING

RELATION OF CASE

This case is a continuation of Robert DeHaeck, Ser. No. 587,554, filed June 17, 1975, for FLUX-CORED WIRE FOR ELECTRIC ARC WELDING OF SOFT STEELS OR LOW ALLOYED STEELS, which prior application is hereby incorporated by reference and which is now U.S. Pat. No. 4,016,399. This continuation is directed to the subject matter involving the use of 1 to 3% by weight of atomized silicates as a part of the mix, without agglomeration, or in other words without mixing with anything in a liquid state to form a paste.

DESCRIPTION OF INVENTION

The invention relates to a flux-cored wire for the automatic or semi-automatic electric arc welding of low-carbon or low-alloyed steels, such flux-cored wires being intended to be used in open arc welding as well as in welding under protection of inert gases, of carbon dioxide ($CO_2$) or of a mixture of both with possible addition of oxygen.

The use of flux-cored wires in electric arc welding under such conditions is a known technique, and the use of powdery mixtures of basic character, called "low hydrogen type", is also well known, with substantial addition of metal to fill the steel sheaths composing said wires.

Such wires produce weld deposits having high mechanical properties, hardness and impact strength, and in the particular case of low-alloyed steels they supply a high equivalent in carbon without underlaying cracks.

Welding arcs obtained with these wires have the drawback of being "sputtering", or in other words, "crackling", and throwing spatter sticking to the base metal; this trouble is intensified with higher welding current, reducing therefore the hourly output to rates incompatible with modern productivities.

The wires as per the invention consist, as is well known, of a strip of steel rolled in tubular shape, optionally with internal folds, (Belgian Patents Nos. 550,612 and 777,588), filled with fluxes of suitable composition, properly treated, and the tubes are reduced to the usual sizes for welding (3.2; 2.4; 1.6; 1.2 millimeters of diameter). Said wires permit maintaining a smooth fusion with relatively high currents, i.e. in much improved conditions of efficiency and output, with weld beads having high and constant mechanical properties along their entire length.

Such results have been obtained in an unexpected manner:

(1) by first agglomerating mixtures of known powders (alkaline-earth carbonates, fluorides, ferrometallic deoxidizers, arc stabilizers, low-alloyed or unalloyed iron powder, etc.) bound with soluble silicates (sodium silicate preferably) at 30° Beaume (4 to 12 grams of silicates for 100 grams of mixture), into pastes;

(2) by then heating the pastes so obtained to 600° C and keeping them at that temperature for 2 hours at least;

(3) by introducing then the pastes into the steel sheaths.

Furthermore, it has been observed that the mere addition, without agglomeration into paste, of lower amounts (1 to 3% by weight of powder) of atomized silicates to the specific powder mixtures, followed by a heat treatment at 600° C during 2 hours and by a sifting at 100 mesh, supplies at "soothing" flux filling which stabilizes the wires as per the invention.

These wires are therefore characterized by:

(a) particular compositions of the powdery mixtures used as flux filling, namely:
  46 to 84% of iron powders (low-alloyed or unalloyed)
  4 to 8% of FeMn (refined)
  2 to 8% of FeSi (45% Si)
  10 to 20% of $CaF_2$
  0 to 6% of $CaCO_3$
  0 to 2% of $SiO_2$ or $Al_2O_3$ or potassium feldspar.
  0 to 2% of potassium titanate
in which
  the $CaCO_3$ can be replaced (up to 5%) by other alkaline-earth carbonates, or by MgO and/or with $CaF_2$ replaced by NaF (up to 10%) and/or with FeSi replaced by CaSi (up to 7%); all diluted in 4 to 12% of soluble silicates at 30° Beaume (sodium silicate preferably) for 100 grams of mixture, or additioned with 1 to 3 grams of atomized silicate for 100 grams of mixture;

(b) baking during 2 hours at 600° C after agglomeration into paste in the case of soluble silicates (not atomized), or without agglomeration into paste in the case of the atomized silicates, and in the latter case the baking is followed by a sifting at 100 mesh as already stated;

(c) filling rates of 30 up to 60 grams of powder for 100 grams of strip.

Arcosarc electrodes of the type described by this present specification (1.6 millimeter diameter) have been manufactured with the following elected powder mixture:

Iron powder: 65.5%
Refined FeMn: 6%
FeSi (45% Si): 7.5%
CaF2: 13%
$CaCO_3$: 6%
$SiO_2$: 1.5%
Potassium titanate: 0.5% used under the following welding conditions:
  360 Amperes - negative pole to the electrode
  30 Volts
  Welding speed: 35 cm/min.

They deposited beads having remarkable mechanical properties:
  Yield strength: 45 Kg/mm2
  Tensile strength: 55 Kg/mm2
  Elongation: 29%
  Area reduction: 66%
  Charpy impact strength:
    at −20° C: 12.2 Kgm/cm2
    at −40° C: 10.5 Kgm/cm2 with a production of 8.64 Kgm per hour.

The steel sheath within which flux is introduced is of low-carbon (minimum 0.03% carbon, maximum 0.09% carbon) or low-alloy (minimum 0.1% of alloying metal and maximum 10% of alloying metal) steel.

The refined ferromanganese is within the range of minimum 80% Mn to maximum 85% Mn.

The ferrosilicon is within the range of minimum 40% Si to maximum 50% Si, but preferably 45% silicon.

The baking or heat treatment step, is within the range of 570° to 620° F for 105 to 150 minutes, but preferably at 600° F for 2 hours.

The sifting is done within the range from 80 mesh to 120 mesh, but preferably 100 mesh.

If desired, up to 10% of the iron powder can be replaced by powders of alloying metals of the group comprising nickel, molybdenum and chrome.

In view of my invention and disclosure, variations and modifications to meet individual whim or particular need will doubtless become evident to others skilled in the art, to obtain all or part of the benefits of my invention without copying the process and product shown, and I therefore claim all such insofar as they fall within the reasonable spirit and scope of my claims.

Having thus described my invention what I claim as new and desire to secure by Letters Patent is:

1. Flux-cored wire for automatic or semi-automatic electric arc welding of low-carbon or low-alloy steel as obtained by using the following manufacturing process comprising the following successive steps:

(1) Preparing a powder mixture of a composition falling within the following weight limits:

46 to 84% of iron powder (zero alloy to maximum 10% alloy);

4 to 8% of refined ferromanganese having from 80 through 85% of its composition manganese;

2 to 8% of powder of the class consisting of ferrosilicon alone, having 45% silicon, and as another category within the class a chemical consisting of calcium silicon, CaSi, up to 7% of the total powder mixture, and also optionally ferrosilicon, FeSi, with the calcium silicon, CaSi, to make the rest of the particular amount within the above range of 2 to 8%;

10 to 20% of powder of the class consisting of calcium fluoride, $CaF_2$, alone, and as another category within the class a chemical consisting of sodium fluoride, NaF, up to 10% of the total powder mixture and also optionally calcium fluoride, CaF, with the sodium fluoride, NaF, to make the rest of the particular amount within the above range of 10 to 20%;

0 to 6% of powder of the class consisting of calcium carbonate, $CaCO_3$, alone, and as other categories within the class a chemical which consists of another alkaline earth carbonate up to 5% of the total powder mixture, and a chemical which consists of magnesium oxide, MgO, up to 5% of the total powder mixture, with in each of these latter cases also optionally calcium carbonate, $CaCO_3$, to make the rest of the particular amount within the above range of 0 to 6%;

0 to 2% of powder of the class consisting of $SiO_2$, $Al_2O_3$, potassium feldspar and mixtures of $SiO_2$ and one of the other two;

0 to 2% of potassium titanate;

(2) Mixing the foregoing mixture with 1 to 3% of silicate in powder form;

(3) Baking the resultant product at 570° C to 620° C for from 105 through 150 minutes;

(4) Introducing the resultant product within a sheath of low-carbon (from 0.03% carbon through 0.09% carbon) or low-alloy (from 0.1% of alloying metal through 10% alloying metal) steel, in the proportion of from 30 through 60 grams of the product for each 100 grams of the sheath.

2. Flux-cored wire of claim 1, in which the silicate in powder form is atomized silicate, and in between the baking and the introducing within the sheath, the resultant product has a sifting at 80 to 120 mesh.

3. A flux-cored wire of claim 1, in which the mixture does not include calcium silicon, sodium fluoride, magnesium oxide, other alkaline-earth carbonates besides calcium carbonate, potassium feldspar or aluminum oxide.

4. A flux-cored wire of claim 1, in which the mixture includes aluminum oxide.

5. A flux-cored wire of claim 1, in which the mixture includes potassium feldspar.

6. A flux-cored wire of claim 1, in which the mixture includes another alkaline-earth carbonate than calcium carbonate.

7. A flux-cored wire of claim 1, in which the mixture includes magnesium oxide.

8. A flux-cored wire of claim 1, in which the mixture includes sodium fluoride.

9. A flux-cored wire of claim 1, in which the mixture includes calcium silicon.

10. A flux-cored wire of claim 1, in which the mixture includes alloying metals of the group comprising nickel, molybdenum and chromium.

* * * * *